(12) United States Patent
Bastide et al.

(10) Patent No.: US 12,002,459 B2
(45) Date of Patent: Jun. 4, 2024

(54) AUTONOMOUS COMMUNICATION INITIATION RESPONSIVE TO PATTERN DETECTION

(71) Applicant: International Business Machines Corporation, Armonk, NY (US)

(72) Inventors: Paul R. Bastide, Ashland, MA (US); Robert E. Loredo, North Miami Beach, FL (US); Matthew E. Broomhall, Goffstown, NH (US)

(73) Assignee: International Business Machines Corporation, Armonk, NY (US)

( * ) Notice: Subject to any disclaimer, the term of this patent is extended or adjusted under 35 U.S.C. 154(b) by 535 days.

(21) Appl. No.: 17/184,582

(22) Filed: Feb. 24, 2021

(65) Prior Publication Data
US 2022/0270598 A1    Aug. 25, 2022

(51) Int. Cl.
*G10L 15/22*    (2006.01)
*G10L 15/06*    (2013.01)
(Continued)

(52) U.S. Cl.
CPC ............ *G10L 15/22* (2013.01); *G10L 15/063* (2013.01); *H04L 51/02* (2013.01); *H04L 51/04* (2013.01);
(Continued)

(58) Field of Classification Search
CPC . G10L 15/22; G10L 15/063; G10L 2015/227; H04L 51/02; H04L 51/04; H04L 67/535; H04L 67/306
See application file for complete search history.

(56) References Cited

U.S. PATENT DOCUMENTS

| 7,523,198 B2 | 4/2009 | Wu |
| 7,890,329 B2 | 2/2011 | Wu |
(Continued)

FOREIGN PATENT DOCUMENTS

| CN | 104301209 B | 1/2015 |
| CN | 107193978 A | 9/2017 |
| EP | 3483748 A1 | 5/2019 |

OTHER PUBLICATIONS

"Enterprise," Twitter Developer, accessed Feb. 22, 2021, 2 pages. <https://developer.twitter.com/en/docs/twitter-api/enterprise>.
(Continued)

*Primary Examiner* — Michael Colucci
(74) *Attorney, Agent, or Firm* — Kelli D. Morin

(57) ABSTRACT

A baseline of behavior is determined for a population of users that interact with an autonomous agent that is configured to respond to natural language prompts of users of the population using respective user profiles for each user. An element associated with a first user that deviates more than a threshold amount from the baseline is identified. In response to the element deviating more than the threshold amount, the autonomous agent is caused to engage the first user unprompted regarding the element via an engagement that is configured to verify an association between the first user and the element. A response from the first user regarding the engagement is determined to verify the association between the first user and the element. A first user profile that corresponds to the first user is updated in response to determining that the first user response verifies the association.

20 Claims, 8 Drawing Sheets

(51) Int. Cl.
*H04L 51/02* (2022.01)
*H04L 51/04* (2022.01)
*H04L 67/50* (2022.01)

(52) U.S. Cl.
CPC ...... *H04L 67/535* (2022.05); *G10L 2015/227* (2013.01)

(56) References Cited

U.S. PATENT DOCUMENTS

| | | | |
|---|---|---|---|
| 9,870,465 B1* | 1/2018 | Levi | H04L 67/306 |
| 10,135,938 B2 | 11/2018 | Dodge | |
| 10,403,290 B2 | 9/2019 | Bangalore | |
| 10,440,181 B1 | 10/2019 | Brown | |
| 2003/0154196 A1* | 8/2003 | Goodwin | G06Q 10/10 |
| 2011/0060587 A1* | 3/2011 | Phillips | G10L 15/30 |
| | | | 704/235 |
| 2013/0067492 A1 | 3/2013 | Fidler | |
| 2016/0232137 A1* | 8/2016 | Liu | G06F 40/134 |
| 2017/0048378 A1* | 2/2017 | Rubinstein | G06F 3/0482 |
| 2017/0070527 A1* | 3/2017 | Bailey | G06F 16/24578 |
| 2019/0068526 A1* | 2/2019 | Xie | H04L 67/303 |
| 2019/0129517 A1* | 5/2019 | Wisnia | G06F 3/0231 |
| 2019/0377853 A1* | 12/2019 | Obaidi | G06F 21/32 |
| 2020/0302344 A1* | 9/2020 | Just | G06F 21/34 |
| 2020/0312118 A1* | 10/2020 | Compton | G08B 31/00 |

OTHER PUBLICATIONS

"Natural Language Classifier," IBM, accessed Feb. 22, 2021, 8 pages. <https://www.ibm.com/watson/services/natural-language-classifier/>.

"Page Feed," Facebook Developers, accessed Feb. 22, 2021, 16 pages. <https://developers.facebook.com/docs/graph-api/reference/v3.2/page/feed>.

"Push technology," Wikipedia, accessed Feb. 22, 2021, 5 pages. <https://en.wikipedia.org/wiki/Push_technology>.

"Webhook," Messenger Platform, accessed Feb. 22, 2021, 6 pages. <https://developers.facebook.com/docs/messenger-platform/webhook>.

Jurafsky, "Conversational Agents," Stanford University, accessed Feb. 22, 2021, 58 pages. <https://web.stanford.edu/class/cs124/lec/chatbot.pdf>.

* cited by examiner

AUTONOMOUS COMMUNICATION INITIATION RESPONSIVE TO PATTERN DETECTION

BACKGROUND

One growing and evolving area of computing devices is functionality regarding interacting with users in natural language, whether written or spoken. Users expect to be able to communicate with many of their computing devices in this way, whether their mobile phones, cars, laptops, tablets, smart home appliances, or the like. Autonomous conversational computing agents are configured to receive user inputs, whether questions (e.g., questions such as "what is the weather like today"), commands (e.g., commands relating to computing device functionality such as "turn the television on" or "turn the heat to 70 degrees"), or the like, and respond accordingly.

SUMMARY

Aspects of the present disclosure relate to a method, system, and computer program product relating to determining a baseline of behavior for a population and identifying when an element is divergent from that baseline, therein causing an autonomous agent to autonomously engage the user as a result of that divergence. For example, the method includes determining a baseline of behavior for a population of users that interact with an autonomous agent. The autonomous agent is configured to respond to natural language prompts of users of the population using respective user profiles for each user of the population. The method also includes identifying an element associated with a first user of the population that deviates more than a threshold amount from the baseline of behavior. The method also includes causing, in response to identifying that the element deviates more than the threshold amount, the autonomous agent to engage the user unprompted regarding the element. The autonomous agent engages the user via an engagement that is configured to verify an association between the first user and the element. The method also includes determining that a response from the first user regarding the engagement verifies the association between the first user and the element. The method also includes updating a first user profile of the respective user profiles that corresponds to the first user in response to determining that the first user response verifies the association.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
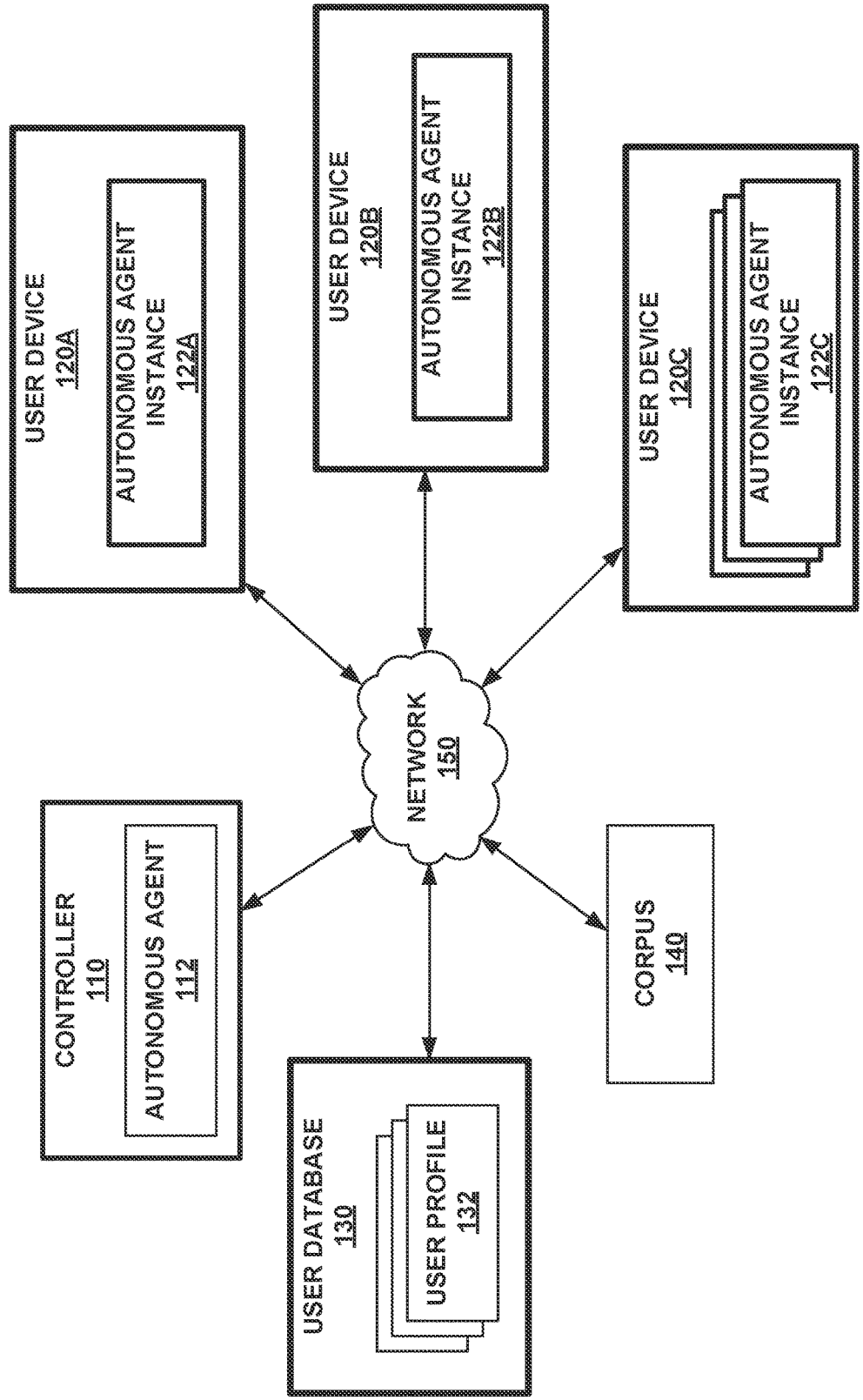
FIG. 1 depicts a conceptual diagram of an example system in which controller may determine a baseline of behavior of a population of users and cause an autonomous agent to autonomously engage with one user to further bind with that user.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to autonomous conversational agents, while more particular aspects of the present disclosure relate to autonomous agents engaging users unprompted to verify associations between the users and various elements to better bind the autonomous agent to the user. While the present disclosure is not necessarily limited to such applications, various aspects of the disclosure may be appreciated through a discussion of various examples using this context.

An increasingly common feature in conventional computing devices is an autonomous conversational computing agent (hereinafter referred to as an "autonomous agent") that is configured to interact with users in a natural language format (e.g., whether written or spoken). For example, a user may interact with such an autonomous agent via computing devices such as cell phones, laptops, desktops, tablets, smart appliances, automobiles, or the like. Users may interact with the autonomous agents to utilize functionality of various computing devices, such as asking an autonomous agent to schedule a meeting with one or more contacts and record the meeting via an electronic calendar, asking an autonomous agent to turn a different computing device (e.g., such as a television) on or off, asking an autonomous agent to modulate settings of computing devices (e.g., turn the heat up on a smart thermostat, change the channel of a television, start a television show using a streaming service), or the like. Additionally, or alternatively, users may interact with the autonomous agent by treating the autonomous agent as if it were a question answering (QA) system that utilizes a corpus of historical and/or real-time data to identify responses to questions, such as asking what the weather is like, asking questions about historical figures, asking questions about the natural world, or the like.

An aim of conventional computing devices is to make the interactions with autonomous agents as natural and helpful as possible by "binding" the autonomous agent to respective users. For example, when two people interact together over time, an observant person will identify what the other person finds important and interesting and will naturally engage in conversations that cover these (often shared) important and interesting topics. Users may appreciate interacting with autonomous agents that reflect such an evolution over time.

As such, conventional computing devices may cause conventional autonomous agents to measure and/or "score" how well various responses as crafted and provided by a conventional autonomous agent are received by a user, and act accordingly. For example, if a user responds in an affirmative and/or positive manner to something that is done/said/written by a conventional autonomous agent, a conventional computing device may "reinforce" this behavior such that the conventional autonomous agent is relatively more likely to provide similar actions/responses in the future in similar situations for this user. Similarly, if a user responds in a negative manner to a conventional autonomous agent action, a conventional computing device may weaken rules that caused the conventional autonomous agent to provide such negatively-received responses, such that the conventional autonomous agent is relatively less likely to provide such responses in the future. By identifying whether a user reception to a provided autonomous agent response was positive or negative, conventional computing systems may look to bind conventional autonomous agents to users over time such that responses reflect what is interesting and/or important to respective users.

However, such conventional techniques and processes for binding conventional autonomous agents to users may be technically deficient (as a result of a technical problem) in making accurate correlations between what a user likes and doesn't like and the provided answers, given the coarseness of the data. Or, put differently, conventional means of binding conventional autonomous agents to users (e.g., via correlating user satisfaction to provided conventional autonomous agent responses) may have a technical problem in the form of lacking data with a sufficient amount of granularity with which conventional computing systems may identify true and accurate correlations.

For example, a conventional autonomous agent may receive a request from a user stating "make a dentist appointment for next Tuesday at 2:15 pm," in response to which the conventional autonomous agent provides a response of "you currently have another appointment next Tuesday at 2:15 pm, should I schedule anyway?," in response to which the user states "dang it, nevermind." A conventional computing system may identify this response of "dang it, nevermind" as being a negative response, but the data may be too coarse such that it is difficult and/or impossible for a conventional computing device to accurately determine which part of the response was negatively received (e.g., whether providing more information on the existing appointment would have been helpful, or whether providing alterative times that were available would have been helpful, or whether the negative reaction was not due to the autonomous agent action but the situation itself, etc.). As a result of the coarseness of the available data, it may take a substantial number of iterations to accurately identify what is important and/or interesting to a user (and such an accurate conclusion may only be determined following one or more incorrect false conclusions as a result of misleading correlations).

Aspects of this disclosure may solve or otherwise address some or all of these problems of conventional systems. A computing device that includes a processing unit executing instructions stored on a memory may provide the functionality that addresses these problems, this computing device herein referred to as a controller. Though this controller is discussed as executing much of the functionality described herein, in other examples much or all of this functionality may be executed by an autonomous agent itself. Put differently, though controller 110 is largely discussed as being provided by a standalone computing device, in other examples the controller may be integrated into an autonomous agent platform, or integrated into some user devices described herein, while providing the functionality described herein.

For example, this controller may be configured to gather and evaluate conversations that a plurality of users is having with a plurality of instances of the autonomous agent. For example, the controller may record some or all of this data regarding interactions between users and the autonomous agent. The controller may use all of this gathered data (and/or other sources of gathered or stored data) to calculate a baseline of behavior of a population, where specific elements of interactions are scored and measured on this baseline. The controller may further identify when individual elements are detected that diverge from this baseline more than a threshold amount, and therein engage the user regarding this detected divergence. For example, the controller would be configured to detect that an aggregate value of how one or more elements score within an interaction exceeds a threshold (e.g., a user specified value, and/or a standard deviation from the baseline), and then engage the user regarding this exceeded value to, e.g., confirm that it reflects something that is important and/or interesting to the user. By causing the autonomous agent to engage the user in response to detecting elements that are divergent to a baseline of a population of the user, the controller may improve an ability of the autonomous agent to bind to the user.

The controller may further fine tune the baseline to be specific to various domains and topics and may improve an ability to bind the autonomous agent via elements that are identified as bi-directional triggers (e.g., elements that are identified as indicating potentially more than one thing, such that a meaning is not immediately identifiable but requires unprompted engagement as described herein to clarify). In some examples, the controller may even determine and update baselines in real-time with current data, such that an "average" and a "atypical" reaction to a current event can be identified (and atypical reactions may be met with tailored responses). For example, the controller may use stream-based computing (occasionally referred to herein as stream computing) to determine baselines and divergent elements in real time, where different detected elements are processed as individual tuples as described herein.

Figure 2:
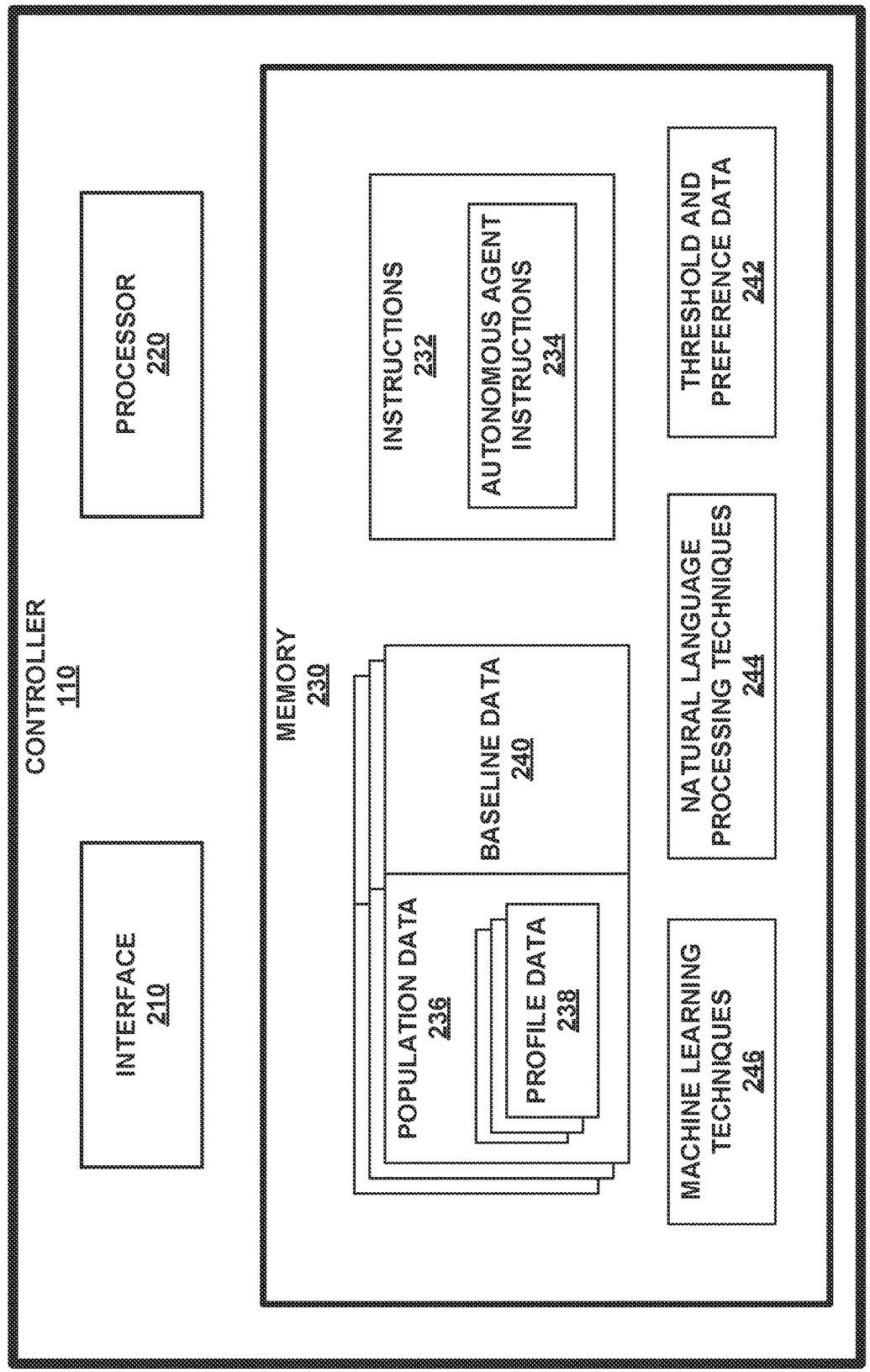
FIG. 2 depicts a conceptual box diagram of example components of the controller of FIG. 1.

For example, FIG. 1 depicts environment 100 in which controller 110 determines when users of a population are acting in a manner that is divergent from that population and therein cause autonomous agent 112 to engage the users in a way that corresponds to the divergent action to bind autonomous agent 112 to those users. As discussed herein, autonomous agent 112 may include a computing agent that is configured to engage with a plurality of users in a natural language manner (e.g., via speech, graphical text) and/or in other manners (e.g., via virtual gestures or haptic-assisted physical gestures). Controller 110 may include a processor coupled to a memory (as depicted in FIG. 2) that stores instructions that cause controller 110 to execute the operations discussed herein. Though autonomous agent 112 is depicted as being a part of controller 110 in FIG. 1 for purposes of illustration (such that autonomous agent 112 may be, e.g., included in the same computing device as controller 110), in other examples controller 110 may be a subcomponent of autonomous agent 112, and/or controller 110 and autonomous agent 112 may be part of separate computing components that work together in some manner to execute the functionality described herein.

Autonomous agent 112 may communicate with users via a plurality of user devices 120A-120C (collectively "user devices 120"). User devices 120 may also include computing devices (similar to computing system of FIG. 2), such as smart phones, laptops, desktops, tablets, home automation devices, smart appliances, or the like. Autonomous agent 112 may communicate with users via a plurality of autonomous agent instances 122A-122C (collectively, "autonomous agent instances 122") on respective user device 120 through which autonomous agent 112 communicates with users.

Autonomous agent 112 may be a chatbot or the like, autonomous agent 112 may be integrated into a question-answering (QA) system, and/or autonomous agent 112 may include home automation and/or personal assistant functionality. For example, autonomous agent 112 may use corpus 140 of data to respond to queries from users as received over autonomous agent instances 122. This corpus 140 may include a mixed repository of data, such as public and/or private data from the Internet, a structured and/or curated database, or the like. Autonomous agent 112 may use QA techniques known in the art to respond to queries relating to, e.g., historical data (e.g., a query of "when was the Emancipation Proclamation issued"), current data (e.g., a query of "what is the weather outside right now"), a query relating to a current database value (e.g., do I have any appointments set up for March 20), or the like.

Controller 110 may gather information on a population of users. Controller 110 may gather information on users as users interact with autonomous agent 112. For example, controller 110 may gather an "opt-in" from users for the express purpose of autonomous agent 112 increasing a technical ability to bind to users, such that autonomous agent 112 may provide better responses over time. Such an opt-in may identify a kind of data to be gathered, a time period over which the data is gathered and/or maintained, a use of the data to be gathered (e.g., where this usage is exclusively and/or primarily to bind the user to autonomous agent 112), and the like.

As used herein, autonomous agent 112 "binding" to users includes autonomous agent 112 identifying preferences of users so that autonomous agent 112 may improve at identifying a meaning of a prompt provided by a given user and subsequently identifying the best response to this prompt. For example, controller 110 may identify those things that are important to the user, and may provide responses that account for this importance. Controller 110 may identify elements as being relatively important or unimportant based on whether those elements have direct or indirect influence over the user (e.g., such that the user changes away from a "standard" decision of a population when under this influence), a user seems to place a certain amount of "social capital" on these elements (where social capital is reflected by what elements cause a user to (re)prioritize tasks, respond promptly (or slowly), take extra time to review, ask for favors), or the like. Put differently, by binding autonomous agent 112 to users via identifying those ways that identified elements associated with a user are divergent from a population (and updating user profiles 132, discussed below, accordingly), autonomous agent 112 may improve an ability to identify a response that can be provided to a user in which each of the elements of the prompt (and the response) are identified and provided with a high degree of confidence.

Controller 110 may store data on users in user database 130. For example, controller 110 may store data on each user within respective user profiles 132 on user database 130. Controller 110 may gather this data via respective autonomous agent instances 122. For example, user profiles 132 may include data that is gathered via natural language communication between users and autonomous agent 112, such as prompts provided by users via autonomous agent instances 122 and/or any replies provided by users that are responsive to an output of autonomous agent 112.

In other examples, controller 110 may use other sensors of user devices 120 to gather data on users. For example, controller 110 may use a location sensor (e.g., a global positioning system (GPS) sensor), a camera, a microphone, a gyroscope, a proximity sensor, or the like of user device 120 to gather locations, images, sounds, movements, or the like of user (including cross-correlations, such as identifying where a user is at what times). Controller 110 may use these in targeted fashions (e.g., as approved by users via the above-referenced opt-in) to gather specific data with which controller may bind autonomous agent 112 to users. For example, controller 110 may only gather data during predetermined times, or only at predetermined locations, or only during predetermined activities, or the like. For another example, controller 110 may only gather data that has a high likelihood to reflect what a user places social capital on, what influences a user, or the like. An example of this might include only gathering time and location data on a user immediately preceding various appointments, so that controller 110 identifies which types of appointments a user leaves early for (e.g., and therein identifies as important) and which types of appointments leaves late for (e.g., and therein identifies as unimportant).

In other examples, controller 110 may analyze a manner in which users interact with the functionality of user devices 120 to gather user data for user profiles 132. For example, controller 110 may gather select predetermined data related to purchases that users make, appointments that users make and/or cancel, phone calls that users answer and/or decline/ignore, how long users take to respond to text messages and/or email, or the like. As above, controller 110 may be configured to only gather that data that is useful to bind autonomous agent 112 to users and has been approved by users for this purpose.

Controller 110 may determine a baseline of behavior for a population. For example, after gathering user profiles 132 on a statistically significant number of users (e.g., 100 users, or 1000 users), controller 110 may determine what a statistically average set of behavior is for that population in a given predetermined situation. Predetermined situations may include events that indicate what a user finds important (or what events reflect an amount of social capital to a user), such as receiving a request for an appointment (where the sets of behaviors include accepting the appointment, suggesting alternate times, declining the appointment), receiving an email (where the set of behaviors include responding in five minutes, responding within an hour, responding within a day, not responding), or the like. In some example, the baseline of behavior includes something akin to a bell curve of expected actions, where some actions are relatively common, and other actions are relatively uncommon, as are measured using metrics such as standard deviation.

User devices 120 may interact with user devices 120, user database 130, and/or corpus 140 over network 150. Network 150 may include a computing network over which computing messages may be sent and/or received. For example, network 150 may include the Internet, a local area network (LAN), a wide area network (WAN), a wireless network such as a wireless LAN (WLAN), or the like. Network 150 may comprise copper transmission cables, optical transmission fibers, wireless transmission, routers, firewalls, switches, gateway computers and/or edge servers. A network adapter card or network interface in each computing/processing device (e.g., controller 110, user devices 120, user database 130, and/or corpus 140) may receive messages and/or instructions from and/or through network 150 and forward the messages and/or instructions for storage or execution or the like to a respective memory or processor of the respective computing/processing device. Though network 150 is depicted as a single entity in FIG. 1 for purposes of illustration, in other examples network 150 may include a plurality of private and/or public networks over which controller 110 may bind autonomous agent 112 as described herein.

In some examples, controller 110 may further gather interactions that users have with other people, such as interactions on social media, interactions over a chatting application, interactions over email, or the like. For example, controller 110 may gather interaction data such as a body of a message, who a message was to and from (including anyone that was carbon copied or blind carbon copied), a full thread of a message, metadata of a message (e.g., such as whether a message was flagged as important), if a message was encrypted or noted as privileged and/or confidential, if anyone "liked" or commented on the message, the size of the message, or the like. Such interaction data may be "pushed" to controller 110 (and/or to user profiles 132) for analysis, and/or such interaction data may be "pulled" using an application programming interface (API) or a feed such as a Really Simply Syndication (RSS) feed. In some examples, as described herein, such interactions as sent to users and received by users may be analyzed in real time using streams-based computing as described herein, such that baselines of a population and/or user profiles 132 are also updated in real time.

Controller 110 may be configured to detect a divergent element, which is to say an action or communicated element of a user that diverges more than a threshold amount from a baseline of a population. For example, controller 110 may analyze n-grams of one or more interactions with users (or interactions of interaction data as described above), where a frequency of an n-gram may indicate importance (and therein divergence from a baseline). For another example, controller 110 may identify that a user responds relatively more promptly, more enthusiastically, and/or more thoroughly to some types of elements, such that these elements are determined to be more important overall (or less important, where an inverse is true). Controller 110 would further identify other examples consistent with this disclosure to be used in identifying that an element diverges from a baseline as discussed herein.

Controller 110 may cause autonomous agent 112 to engage a user with an engagement that is related to the divergent element. Controller 110 may cause autonomous agent 112 to engage a user in a manner that is substantially unprompted, such that some or all information (and/or action) of the engagement was not specifically requested by the user. For example, controller 110 may cause autonomous agent 112 to engage during a period in which the user has not prompted any autonomous agent instances 122 (e.g., where a user has not interacted with any autonomous agent instances 122 for at least one minute, or five minutes, or the like), such that there was no ongoing interaction when autonomous agent 112 engages the user. For another example, controller 110 may identify that an element has diverged from a baseline during an ongoing interaction (e.g., via a bi-directional trigger that could mean any of a few things), and may cause autonomous agent 112 to supplement a response with a clarification regarding the divergent element, or even asking a user to restate a previous prompt. Further, controller 110 may cause autonomous agent 112 to engage with the user in a way that is configured to verify an association between the element and the user.

In some examples, controller 110 may cause autonomous agent 112 to engage the user regarding the element substantially immediately upon detecting that the element diverges more than a threshold amount. For example, immediately upon detecting that a user is purchasing tickets for a local sports team, controller 110 may cause autonomous agent 112 to ask whether or not the user is a fan of the local sports team. In other examples, controller 110 may cause autonomous agent to engage the user regarding the element during a subsequent interaction with user in which the element is related. For example, controller 110 may initially detect that a user may regard a certain client as particularly important via some divergent elements regarding client ABC at a first period of time. Subsequently to this (at a later second period of time), controller 110 may identify that a user is asking via autonomous agent instance 122 to schedule a meeting that conflicts with an already scheduled meeting with this client ABC, in response to which controller 110 may cause the autonomous agent 112 to inform the user of this already schedule meeting in a manner that is configured to verify this potential importance (e.g., "I can schedule that new meeting at that time, but you already have a meeting scheduled with client ABC, so am I correct to assume that we should leave that meeting and find a new time?"). In some examples a user may specify a manner in which controller 110 is to autonomously engage the user via a configurable set of preferences and thresholds.

Once controller 110 causes the autonomous agent 112 to engage the user, controller 110 determines whether or not the user response verifies an association with (or disassociates herself from) the element. For example, if the element related to a local sports team and controller 110 causes autonomous agent 112 to ask about that sports team over autonomous agent instance 122, controller 110 may determine whether or not the user indicates that she is a fan, she is not a fan, she is only a warm weather fan (e.g., such that controller 110 should check how good a team is doing before actions that relate to this team would diverge from the baseline), or the like.

Once controller 110 determines whether or not a user verified an association with an element or disassociated with an element (and/or determines a degree to which the user did so), controller 110 updates user profile 132 accordingly. For example, controller 110 may determine that a user has indicated a strong association with a specific client, and controller 110 may therefore update user profile 132 associated with this user to reflect that this specific client is relatively important to the user. For another example, controller 110 may determine that a user has indicated a relatively weak association with a certain vendor, in response to which controller 110 may update the user's user profile 132 to reflect that. In this way, controller 110 may further bind autonomous agent 112 to respective users to improve an ability of autonomous agent 112 to converse in a natural manner with answers that are provided with a high confidence score.

As would be understood by one of skill in the art, updating user profiles 132 may include updating conversation factors that autonomous agent 112 uses to engage in a conversation with users. For example, conversation factors may include various rules, weights, or the like that autonomous user 112 uses to conduct conversations with users. For example, following the update to user profiles 132, autonomous agent 112 may receive a new prompt over one or numerous autonomous agent instances 122. The prompt may be of a variety or class for which there is a typical manner of replying as identified by default rules and weights (e.g., where these rules and weights may be default for all interactions conducted by autonomous agent 112, or default for a given population of users, or the like). For example, the prompt may relate to scheduling an appointment with a vendor at 1:00 on April 1, where the user currently has no appointments scheduled at that date and time, such that a typical response (e.g., as defined by the rules and weights of autonomous agent 112) would be to schedule the appointment at this date and time (e.g., set up the appointment in an electronic calendar associated with the user and/or sending a confirmation email to the vendor).

However, rather than responding in this first "default" manner, controller 110 may check user profile 132 and identify that, as determined from previous times that autonomous agent engaged the user as described herein, the vendor has an indicated low importance and/or that the user has indicated being a fan of a local sports team that has an opening day game scheduled for that time. In response to this, rather than simply scheduling the appointment in the first manner as would be standard for prompts of this class/variety, controller 110 may cause autonomous agent to send a message in a second manner by, e.g., sending a message along the lines of "you currently have no appointments scheduled for April 1 at 1:00, however, the local sports team has an Opening Day game at 1:10 on April 1; would you like me to schedule the appointment with vendor at 1:00, or perhaps tell you the next available time for such a meeting?" Controller 110 may cause autonomous agent 112 to respond in this second manner as a result of different rules and/or weights that cause autonomous agent to consider the divergent element (i.e., the local sports team). Put differently, by being configured to detect elements that diverge from a baseline of behavior for a user and autonomously engage the user at an opportune time to confirm (or deny) an association between the user and the elements, controller 110 may improve an ability to identify more or all data that is relevant in responding to prompts from a user. This improvement may provide controller 110 with a better technical ability to identify relevant data for a query in comparison to conventional autonomous agents.

As described above, controller 110 may include or be part of a computing device that includes a processor configured to execute instructions stored on a memory to execute the techniques described herein. For example, FIG. 2 is a conceptual box diagram of such computing system 200 of controller 110. While controller 110 is depicted as a single entity (e.g., within a single housing) for the purposes of illustration, in other examples, controller 110 may include two or more discrete physical systems (e.g., within two or more discrete housings). Controller 110 may include interface 210, processor 220, and memory 230. Controller 110 may include any number or amount of interface(s) 210, processor(s) 220, and/or memory(s) 230.

Controller 110 may include components that enable controller 110 to communicate with (e.g., send data to and receive and utilize data transmitted by) devices that are external to controller 110. For example, controller 110 may include interface 210 that is configured to enable controller 110 and components within controller 110 (e.g., such as processor 220) to communicate with entities external to controller 110. Specifically, interface 210 may be configured to enable components of controller 110 to communicate with user devices 120, user database 130, corpus 140, or the like. Interface 210 may include one or more network interface cards, such as Ethernet cards and/or any other types of interface devices that can send and receive information. Any suitable number of interfaces may be used to perform the described functions according to particular needs.

As discussed herein, controller 110 may be configured to bind autonomous agent 112 to users by identifying elements that diverge from baseline behaviors and causing autonomous agent 112 to autonomously engage the user regarding these elements. Controller 110 may utilize processor 220 to thusly bind autonomous agent 112 to users. Processor 220 may include, for example, microprocessors, digital signal processors (DSPs), application specific integrated circuits (ASICs), field-programmable gate arrays (FPGAs), and/or equivalent discrete or integrated logic circuits. Two or more of processor 220 may be configured to work together to bind autonomous agent 112 to users accordingly.

Processor 220 may bind users to autonomous agent 112 according to instructions 232 stored on memory 230 of controller 110. Further, autonomous agent 112 may respond to queries and prompts of a user according to autonomous agent instructions 234 as stored on memory of controller 110. Memory 230 may include a computer-readable storage medium or computer-readable storage device. In some examples, memory 230 may include one or more of a short-term memory or a long-term memory. Memory 230 may include, for example, random access memories (RAM), dynamic random-access memories (DRAM), static random-access memories (SRAM), magnetic hard discs, optical discs, floppy discs, flash memories, forms of electrically programmable memories (EPROM), electrically erasable and programmable memories (EEPROM), or the like. In some examples, processor 220 may bind autonomous agent 112 to users as described herein according to instructions 232 of one or more applications (e.g., software applications) stored in memory 230 of controller 110.

In addition to instructions 232, 234, in some examples gathered or predetermined data or techniques or the like as used by processor 220 to bind users to autonomous agent 112 as described herein may be stored within memory 230. For example, memory 230 may include information described above that is gathered from user devices 120 and/or user database 130. For example, as depicted in FIG. 2, memory 230 may include population data 236 as well as baseline data 240. Population data 236 may include data that defines a population of users (e.g., a group of people that share one or more characteristics that makes each person of the population statistically more likely to act in similar manners). For example, population data 236 may include an age range, one or more professions, geographic locations, or the like. Each set of population data 236 may be related to a respective set of baseline data 240, where baseline data 240 establishes the expected set of behaviors for the population of population data 236. For example, baseline data 240 may define a distribution of behaviors (e.g., such as a bell curve distribution), with defined predetermined actions that are one standard deviation from normal, two standard deviations, etc.

Population data 236 may include profile data 238. Profile data 238 may include data on each individual user within a population, such as a specific age of a user, a specific occupation, a state of residence, or the like. Profile data 238 may include some or all interactions that autonomous agent 112 has had with user (e.g., via autonomous agent instances 122). As discussed above, profile data 238 may also include interaction data that refers to interactions that a user has had with other people as gathered from social media, chatting application, electronic mail applications, or the like. Further, as controller 110 binds autonomous agent 112 to users, profile data 238 may include associations that user has to various elements, where these associations are not shared with all users of the population.

Further, memory 230 may include threshold and preference data 242. Threshold and preference data 242 may include thresholds that define a manner in which autonomous agent 112 is to engage a respective user (e.g., such as how to autonomously engage a user to verify an association, and/or how to subsequently engage a user once an association is verified). For example, threshold and preference data 242 may provide preferred times for engagement (e.g., only during evenings, or during an ongoing interaction with autonomous agent 112), preferred locations for engagement (e.g., acceptable to engage at home, but not acceptable during meetings at work), and/or preferred means for engagement (e.g., engaging with haptic feedback when a user is at a house of worship) regarding how autonomous agent 112 autonomously engages a user. In some examples, threshold and preference data 242 may include a cooldown clock such that a user is engaged no more than a specific amount over a given period of time (e.g., no more than once a day and no more than 4 times a week), to avoid over-engaging a user to confirm associations. Threshold and preference data 242 may also include a threshold deviation from a baseline that is required to cause autonomous agent 112 to engage a user. For example, a user may specify within threshold and preference data 242 that controller 110 is only to identify an element as deviating from a baseline for deviations that are at least one or two standard deviations from a median behavior, or the like.

Memory 230 may further include NLP techniques 244. NLP techniques 244 can include, but are not limited to, semantic similarity, syntactic analysis, and ontological matching. For example, in some embodiments, processor 220 may be configured to natural language data as gathered from a first user over one or more autonomous agent instances 122 to determine semantic features (e.g., word meanings, repeated words, keywords, etc.) and/or syntactic features (e.g., word structure, location of semantic features in headings, title, etc.) of this natural language data. Ontological matching could be used to map semantic and/or syntactic features to a particular concept. The concept can then be used to determine the topic of messages, and to divide the message into a group of elements. In this same way, controller 110 may identify a set of elements as communicated by a user, and then determine whether or not an element deviates more than a threshold from a baseline as described herein.

Memory 230 may further include machine learning techniques 246 that controller 110 may use to improve a process of binding autonomous agent 112 to users as discussed herein over time. Machine learning techniques 246 can comprise algorithms or models that are generated by performing supervised, unsupervised, or semi-supervised training on a dataset, and subsequently applying the generated algorithm or model to bind autonomous agent 112 to users. Using these machine learning techniques 246, controller 110 may improve an ability of binding autonomous agent 112 to user over time. For example, controller 110 may identify over time certain associations that certain users are most likely to verify within certain populations, therein searching for these certain associations, to improve a rate of accurately finding and acting on things that are important to users.

Machine learning techniques 246 can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques. Specifically, machine learning techniques 244 can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial ñaive Bayes, averaged one-dependence estimators (AODE), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning algorithms.

Figure 3:
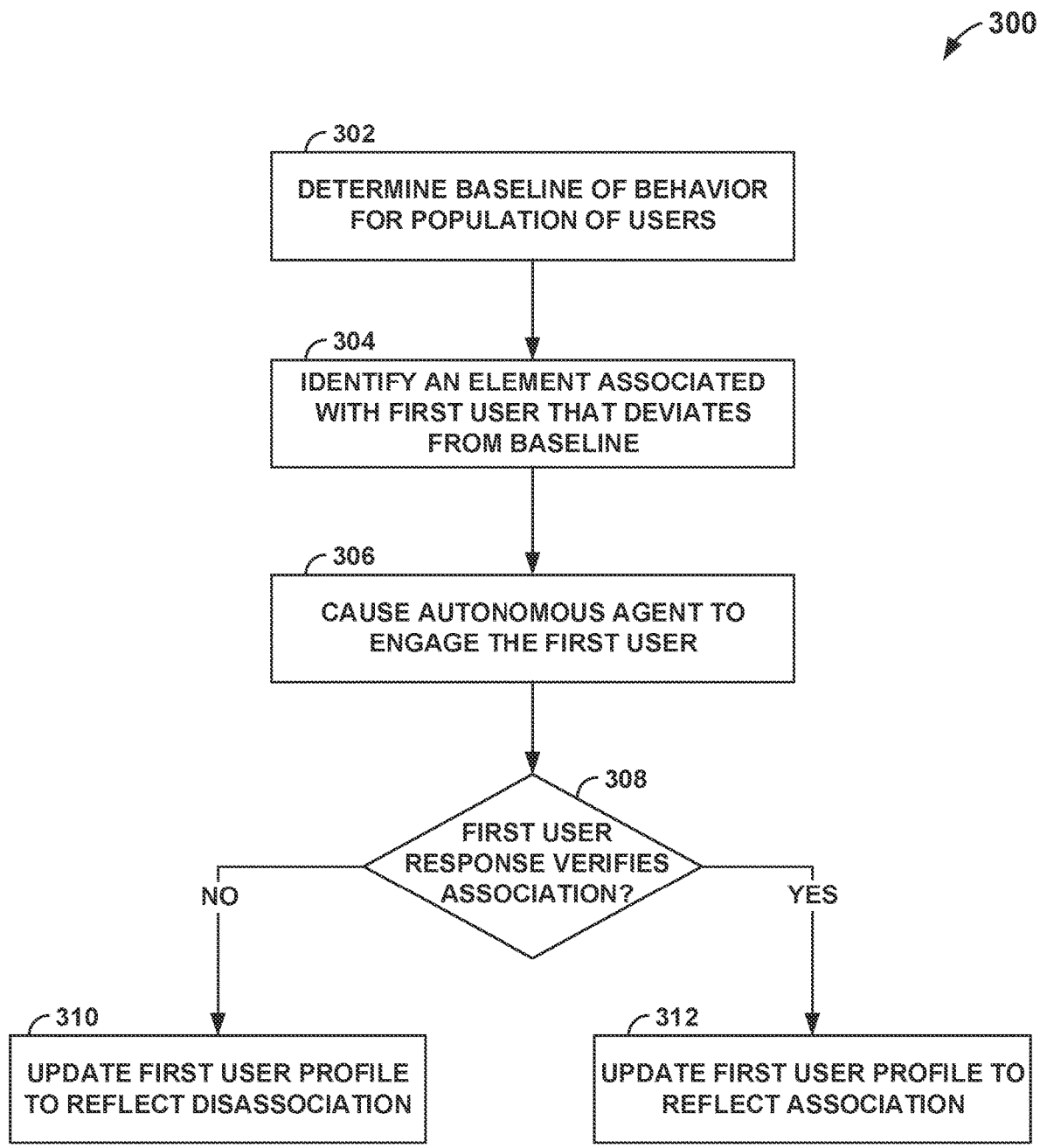
FIG. 3 depicts an example flowchart by which the controller of FIG. 1 may determine a baseline of behavior of a population and then cause an autonomous agent to autonomously engage with a user to bind to that user.

Using these components, controller 110 may bind autonomous agent 112 to users by engaging users in response to user actions diverging more than a threshold amount from population baselines as discussed herein. For example, controller 110 may bind autonomous agent 112 to users according to flowchart 300 depicted in FIG. 3. Flowchart 300 of FIG. 3 is discussed with relation to FIG. 1 for purposes of illustration, though it is to be understood that other systems may be used to execute flowchart 300 of FIG. 3 in other examples. Further, in some examples controller 110 may execute a different method than flowchart 300 of FIG. 3, or controller 110 may execute a similar method with more or less steps in a different order, or the like.

Controller 110 determines a baseline of behavior (302). Controller 110 determines the baseline of behavior for a population of users that interact with autonomous agent 112. The baseline of behaviors may define the expected behaviors of the population. For example, this may include standard and/or predicted usage of functionality of user devices, such as taking a determined percentage of calls, scheduling/rescheduling/missing a determined percentage of meetings, replying to a determined percentage of texts/emails, or the like, where these determined percentages are part of the baseline. For another example, this may include certain social proclivities such as an inclination for sport fandom, happy hours, or the like. Controller 110 may determine these baselines by observing a substantial number of users (e.g., dozens or hundreds or thousands) of users over a substantial amount of interactions (e.g., dozens or hundreds of instances of different classes of behaviors) over a long period of time (e.g., a few weeks or a few months). Further, as discussed herein, controller 110 may determine and update baselines in real time using stream-based computing, where a number of sources of information (e.g., social media, chatting applications, email, autonomous agent instances 122) are pulled or pushed to controller 110 as tuples, and therein analyzed in real time to reflect ongoing trends.

In some examples, controller 110 determines a plurality of baselines of behaviors, such as a respective baseline of behaviors for each of a plurality of populations. For example, controller 110 may determine a first baseline for users that share a first set of characteristics (e.g., age, profession, relationship status, etc.), and a second baseline for users that share a second set of characteristics (e.g., that are different from the first characteristics). Controller 110 may determine these populations such that users within these populations generally have similar baselines (e.g., such that users within these populations reschedule appointments at similar rates, attend happy hours at similar rates, answer phone calls at similar rates, or the like). By establishing different baselines for different populations, controller 110 may better identify when a user is acting in a way that is divergent, and therein potentially worth changing a default conversation factor that autonomous agent 112 uses to interact with the user.

In some examples, the baseline as determined by controller 110 may include a range of normal (e.g., a bell curve of expected actions), where a deviation is a predetermined amount outside of the expected range of normal (e.g., one standard deviation away from an "average" outcome, or two standard deviations, or the like). For example, controller 110 may see that an average rate of rescheduling appointments is 15% of appointments, but detect that over a period of time that a user has rescheduled only 1% of appointments with a specific individual (e.g., indicating that this specific individual may be deemed "important" to the first user), where this difference (from 15% to 1%) is two standard deviations away from the median of 15%.

Controller 110 identifies an element associated with a first user of the population that deviates from the baseline (304). For example, controller 110 may track various n-grams of all interactions of a user and identify that a certain client is used more than a threshold amount, such that this client may be important. For another example, controller 110 may break down a prompt and/or a reply from a user into a set of natural language elements and analyze these elements using NLP techniques, and controller 110 may identify that one of these natural language elements deviates from a baseline. For example, if controller 110 identifies that in response to a conflict with a dentist appointment and a business appointment that a user states "oh, she is my boss; I should reschedule," controller 110 may identify a deviation from a baseline of the population (e.g., where most people do not reschedule dentist appointments, and/or where meetings with a boss are identified as important).

In some examples, controller 110 may identify one or more elements that diverge from the baseline when analyzing data that was not collected over autonomous agent instances 122. This may include controller 110 analyze data regarding how a user utilizes functionality of user devices 120, controller 110 analyzing sensor data as gathered from user devices 120, communication data from other sources (e.g., such as social media, email, chatting applications), or the like. For example, controller 110 may identify that user device 120A has purchased tickets to a local sporting event. Controller 110 may identify that something about the act of purchasing tickets is outside of a baseline of behavior, whether the very act of getting the seats (e.g., where most people in the population do not get tickets), the timing of getting the seats (e.g., getting the seats far earlier than is typical for the population), the type of seats (e.g., getting the "best" seats at the event), or the like, therein identifying that this element may indicate that something relating to the event (e.g., the sports team itself, or a person going to the event with the user) is important to the user.

Controller 110 causes the autonomous agent to engage the first user (306). Controller 110 may engage the first user in response to determining that the element deviates more than the threshold amount from the baseline. Controller 110 may engage the first user in an unprompted fashion, by, e.g., asking the user a question without a prompt form the user, or by providing information that was not specifically requested by the user. Controller 110 may engage the first user via written or verbal engagement that relates to the element. For example, controller 110 may send the first user an engagement that is specifically configured to verify whether or not the first user has an association between the first element (e.g., where this association means that the first user thinks that the first element is relatively important, or relatively unimportant, or the like).

Controller 110 may determine whether or not a response from the first user verifies this association between the element and the first user (308). For example, controller 110 may send an engagement to the first user asking if the first user is going to watch a game relating to a local sports team, where an affirmative answer affirms the association between the first user and the element (e.g., where the element is the local sports team), and a negative answer disassociates the first user from the element. For another example, controller 110 may embellish a current discussion with a first user regarding an appointment with a certain user to verify that this type of meeting is important in response to the user specifying that the user would like to set two reminders for the meeting. After confirming that an element is associated with the user in the manner identified by controller 110, controller 110 updates a respective user profile 132 to reflect this association (312). Updating user profiles 132 may include indicating that the respective user has a preference that is outside of a baseline of behavior. For example, updating user profiles 132 in response to receiving a verification may include changing one or more rules or weights that autonomous agent 112 uses to engage with users over autonomous agent instances 122. Conversely, controller 110 may also update user profile 132 in response to determining that a user disassociates with this element (310). An update to user profiles 132 responsive to a user disassociating with an element may include affirming that the user is within the baseline of behavior regarding that element. For example, updating user profiles 132 responsive to a user disassociating with an element may include strengthening current rules and/or weights with which autonomous agent 112 associates with users.

As discussed herein, controller 110 may utilize stream-based computing to identify elements that are divergent from a baseline. For example, controller 110 may use stream-based computing to analyze substantially all interaction data of users (e.g., interactions that users are having with autonomous agent 112 and with other people) using all user devices 120, where such data is pulled or pushed into a stream-based computing application and converted into tuples for processing. By using stream-based computing, controller 110 may be configured to determine and/or update baselines of behavior for populations in real-time (e.g., such that a baseline of expected behavior is identified in real-time responsive to current events), and/or controller 110 may use stream-based computing to improve a speed at which an element is detected to be divergent. Therefore, using stream-based computing, controller 110 may update a baseline of behavior for one or more populations in real-time, and therein identify if any element is divergent for this baseline in real-time, potentially engaging a user regarding such divergence in real-time depending upon preferences and thresholds of the user.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a transmission control protocol and interne protocol (TCP/IP) socket). When a stream operator receives data, it may perform operations, such as analysis logic, which may change the tuple by adding or subtracting attributes, or updating the values of existing attributes within the tuple. When the analysis logic is complete, a new tuple is then sent to the next stream operator. Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application. A particular stream operator may not reside within the same operating system process as other stream operators. In addition, stream operators in the same operator graph may be hosted on different nodes, e.g., on different compute nodes or on different cores of a compute node.

Data flows from one stream operator to another in the form of a "tuple." A tuple is a sequence of one or more attributes associated with an entity. Attributes may be any of a variety of different types, e.g., integer, float, Boolean, string, etc. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Tuples are received and output by stream operators and processing elements. An input tuple corresponding with a particular entity that is received by a stream operator or processing element, however, is generally not considered to be the same tuple that is output by the stream operator or processing element, even if the output tuple corresponds with the same entity or data as the input tuple. An output tuple need not be changed in some way from the input tuple.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second. Unless the stream operators are located in the same processing element, it is necessary to use an inter-process communication path each time a tuple is sent from one stream operator to another. Inter-process communication paths can be a critical resource in a stream computing application. According to various embodiments, the available bandwidth on one or more inter-process communication paths may be conserved. Efficient use of inter-process communication bandwidth can speed up processing.

An operator graph can be an execution path for a plurality of stream operators to process a stream of tuples. In addition to stream operators, the operator graph can refer to an execution path for processing elements and the dependent stream operators of the processing elements to process the stream of tuples. Generally, the operator graph can have a plurality of stream operators that produce a particular end result, e.g., calculate an average. An operator graph may be a linear arrangement of processing elements and/or operators, or it may include one or more distinct execution paths, also known as sub-processes, methods, or branches.

A stream computing application may have several "jobs" (i.e., specific applications) executing in parallel. Each job may be associated with an individual data flow. These individual data flows may be thought of as separate operator graphs or portions of the same logical operator graph. In either case, a job or administrator may specify a particular stream of data (e.g., a connection between processing elements or operators in the operator graph) as "exportable." A different job may then dynamically connect to the exportable data stream (i.e., import the data stream). This is referred to as a "dynamic connection" because both jobs are currently executing when they begin to share the data stream.

Figure 4:
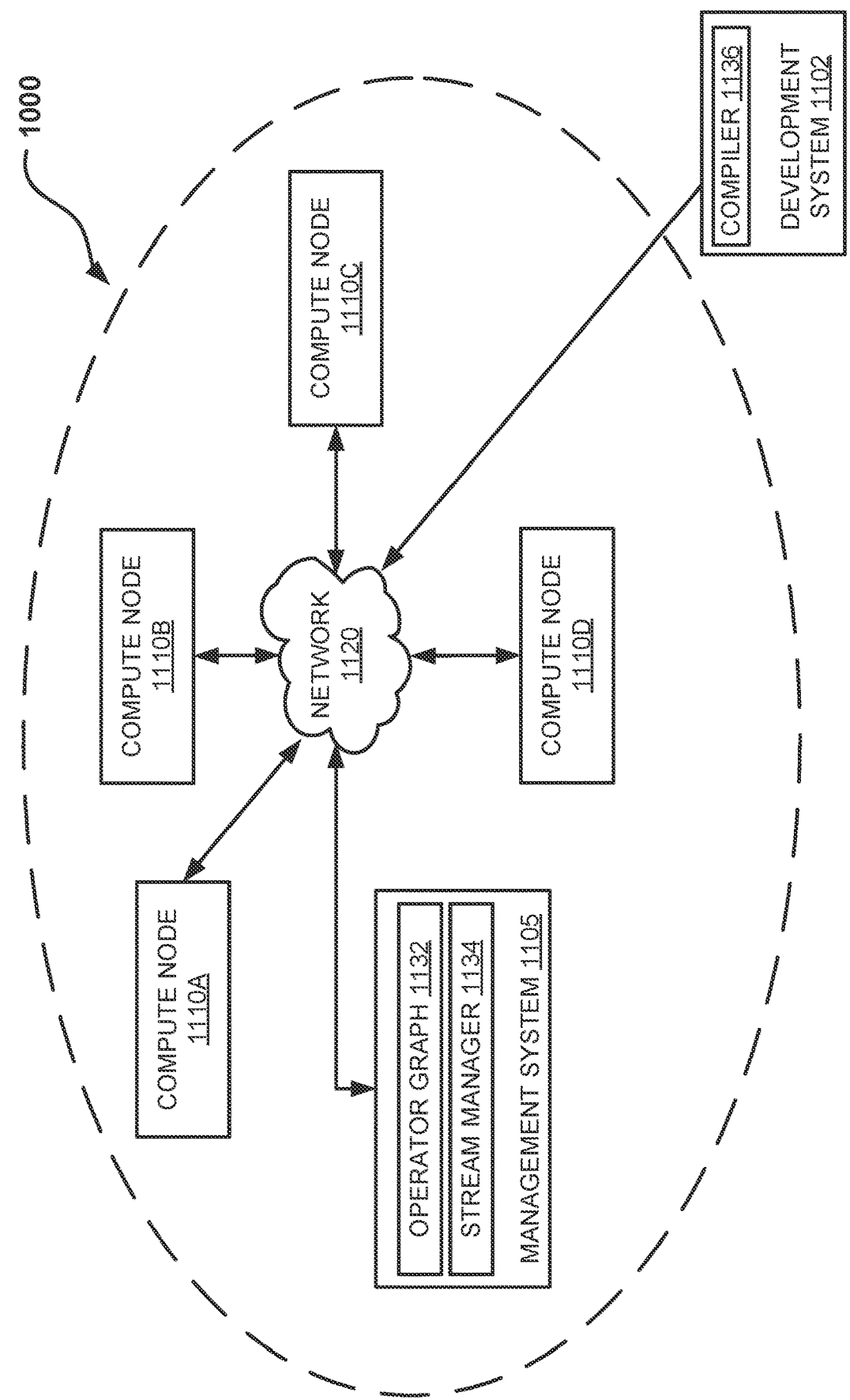
FIG. 4 illustrates a computing infrastructure configured to execute a stream computing application.

FIG. 4 illustrates one exemplary computing infrastructure 1000 that may be configured to execute a stream computing application, according to some embodiments. The computing infrastructure 1000 includes a management system 1105 and two or more compute nodes 1110A-1110D—i.e., hosts—which are communicatively coupled to each other using one or more communications networks 1120. The communications network 1120 may include one or more servers, networks, or databases, and may use a particular communication protocol to transfer data between the compute nodes 1110A-1110D. A development system 1102 may be communicatively coupled with the management system 1105 and the compute nodes 1110 either directly or via the communications network 1120.

The communications network 1120 may include a variety of types of physical communication channels or "links." The links may be wired, wireless, optical, or any other suitable media. In addition, the communications network 1120 may include a variety of network hardware and software for performing routing, switching, and other functions, such as routers, switches, or bridges. The communications network 1120 may be dedicated for use by a stream computing application or shared with other applications and users. The communications network 1120 may be any size. For example, the communications network 1120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 5:
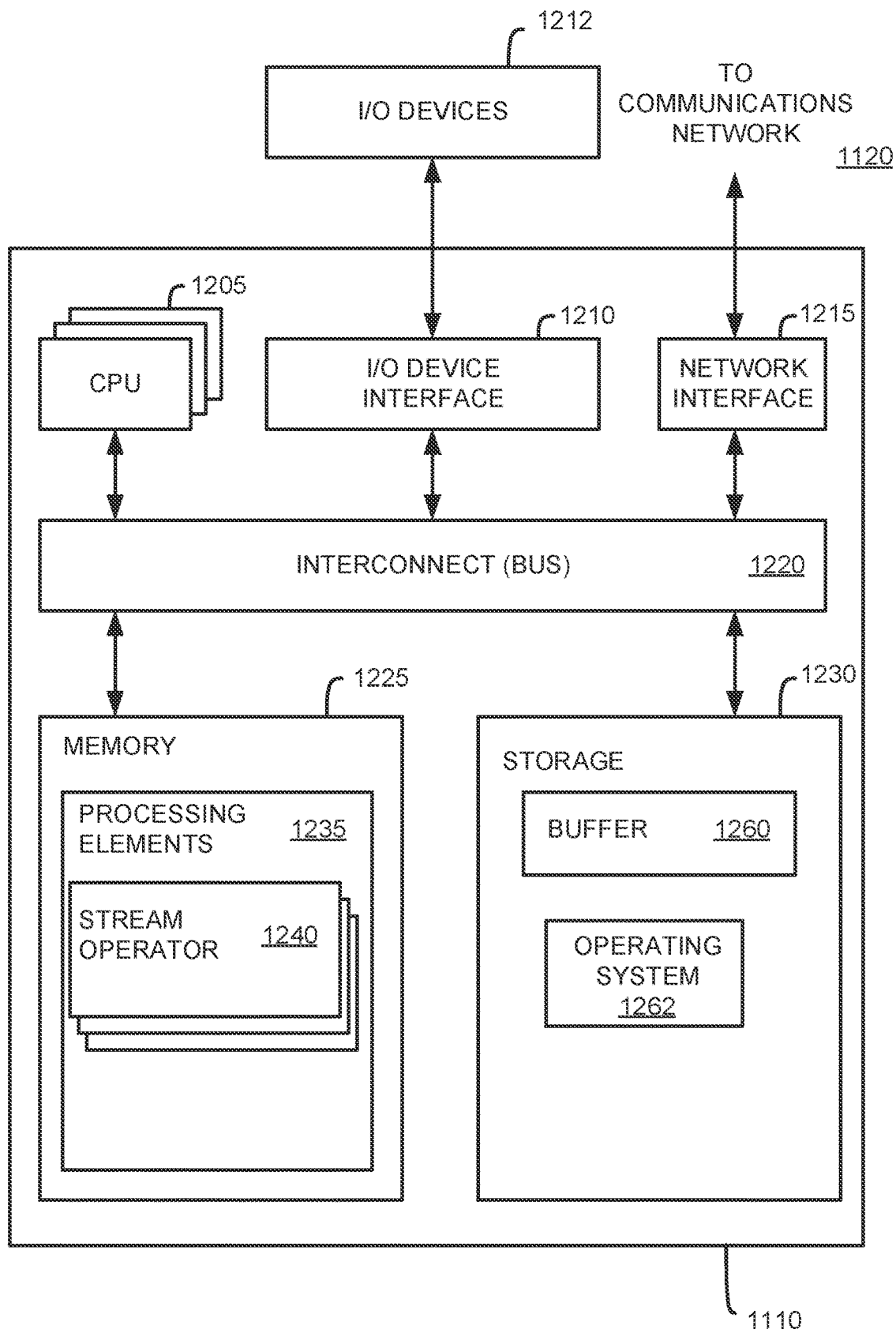
FIG. 5 illustrates a more detailed view of a compute node of FIG. 4.

FIG. 5 is a more detailed view of a compute node 1110, which may be the same as one of the compute nodes 1110A-1110D of FIG. 4, according to various embodiments. The compute node 1110 may include, without limitation, one or more central processing units (CPUs) 1205, network interface 1215, interconnect 1220, memory 1225, and storage 1230. The compute node 1110 may also include I/O device interface 1210 used to connect I/O devices 1212, e.g., keyboard, display, and mouse devices, to the compute node 1110.

Each CPU 1205 retrieves and executes programming instructions stored in memory 1225 or storage 1230. Similarly, CPU 1205 stores and retrieves application data residing in memory 1225. Interconnect 1220 is used to transmit programming instructions and application data between each CPU 1205, I/O device interface 1210, storage 1230, network interface 1215, and memory 1225. Interconnect 1220 may be one or more busses. CPUs 1205 may be a single CPU, multiple CPUs, or a single CPU having multiple processing cores in various embodiments. In one embodiment, processor 1205 may be a digital signal processor (DSP). One or more processing elements 1235 (described below) may be stored in the memory 1225. Processing element 1235 may include one or more stream operators 1240 (described below). In one embodiment, processing element 1235 is assigned to be executed by only one CPU 1205, although in other embodiments stream operators 1240 of processing element 1235 may include one or more threads that are executed on two or more CPUs 1205. Memory 1225 is generally included to be representative of a random-access memory, e.g., Static Random-Access Memory (SRAM), Dynamic Random-Access Memory (DRAM), or Flash. Storage 1230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. Network interface 1215 is configured to transmit data via communications network 1120.

A stream computing application may include one or more stream operators 1240 that may be compiled into "processing element" container 1235. Two or more processing elements 1235 may run on the same memory 1225, each processing element having one or more stream operators 1240. Each stream operator 1240 may include a portion of code that processes tuples flowing into a processing element and outputs tuples to other stream operators 1240 in the same processing element, in other processing elements, or in both the same and other processing elements in a stream computing application. Processing elements 1235 may pass tuples to other processing elements that are on the same compute node 1110 or on other compute nodes that are accessible via communications network 1120. For example, processing element 1235 on compute node 1110A may output tuples to processing element 1235 on compute node 1110B.

Storage 1230 may include buffer 1260. Although shown as being in storage, buffer 1260 may be located in memory 1225 of compute node 1110 or in a combination of both memories. Moreover, storage 1230 may include storage space that is external to compute node 1110, such as in a cloud.

Compute node 1110 may include one or more operating systems 1262. Operating system 1262 may be stored partially in memory 1225 and partially in storage 1230. Alternatively, an operating system may be stored entirely in memory 1225 or entirely in storage 1230. The operating system provides an interface between various hardware resources, including CPU 1205, and processing elements and other components of the stream computing application. In addition, an operating system provides common services for application programs, such as providing a time function.

Figure 6:
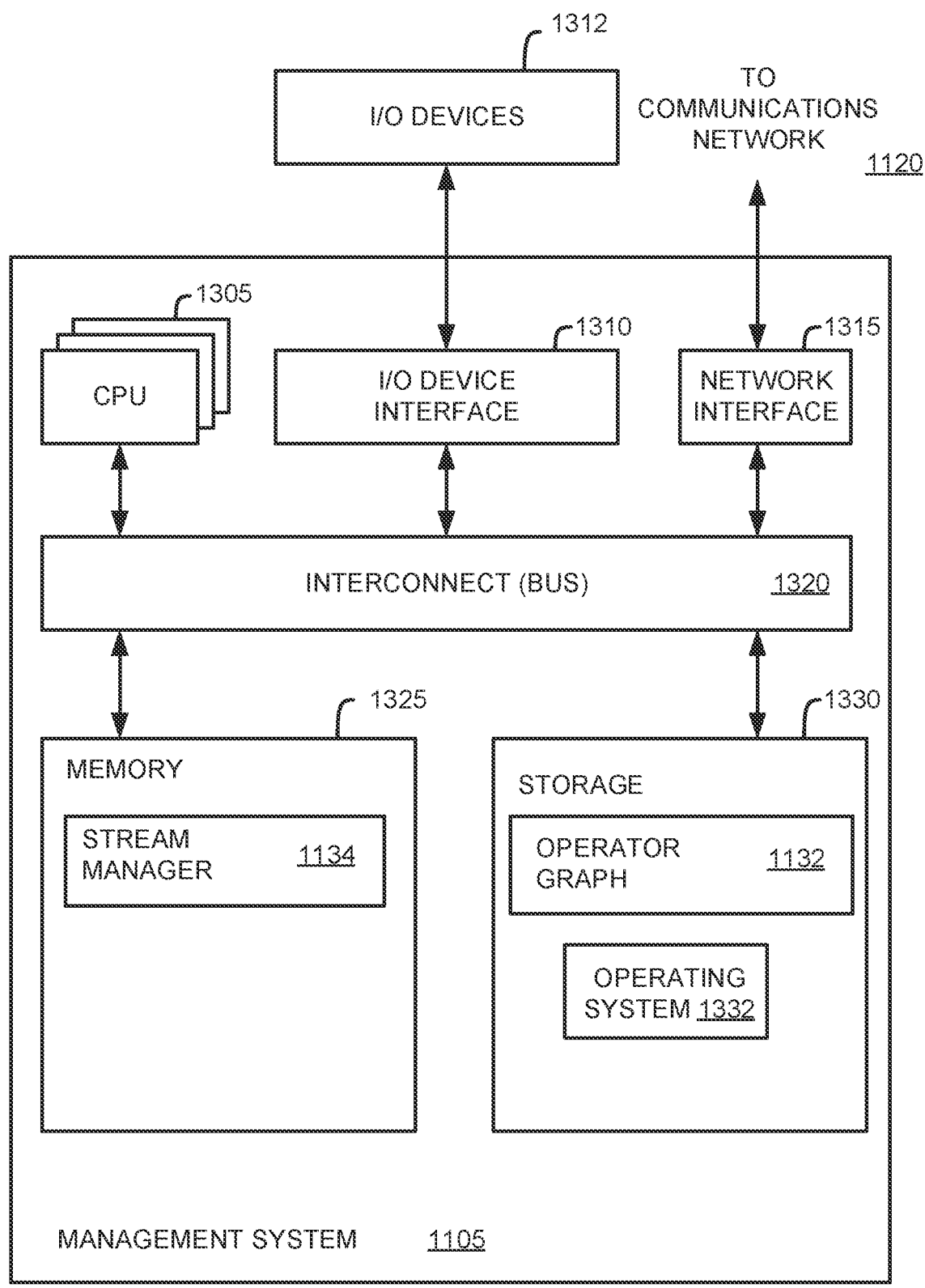
FIG. 6 illustrates a more detailed view of the management system of FIG. 4.

FIG. 6 is a more detailed view of management system 1105 of FIG. 4 according to some embodiments. Management system 1105 may include, without limitation, one or more processors (CPUs) 1305, network interface 1315, interconnect 1320, memory 1325, and storage 1330. Management system 1105 may also include I/O device interface 1310 connecting I/O devices 1312, e.g., keyboard, display, and mouse devices, to management system 1105.

Each CPU 1305 retrieves and executes programming instructions stored in memory 1325 or storage 1330. Similarly, each CPU 1305 stores and retrieves application data residing in memory 1325 or storage 1330. Interconnect 1320 is used to move data, such as programming instructions and application data, between CPU 1305, I/O device interface 1310, storage unit 1330, network interface 1315, and memory 1325. Interconnect 1320 may be one or more busses. CPUs 1305 may be a single CPU, multiple CPUs, or a single CPU having multiple processing cores in various embodiments. In one embodiment, processor 1305 may be a DSP. Memory 1325 is generally included to be representative of a random-access memory, e.g., SRAM, DRAM, or Flash. Storage 1330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. Network interface 1315 is configured to transmit data via communications network 1120.

Memory 1325 may store stream manager 1134. Additionally, storage 1330 may store operator graph 1132. Operator graph 1132 may define how tuples are routed to processing elements 1235 (FIG. 5) for processing.

Management system 1105 may include one or more operating systems 1332. Operating system 1332 may be stored partially in memory 1325 and partially in storage 1330. Alternatively, an operating system may be stored entirely in memory 1325 or entirely in storage 1330. The operating system provides an interface between various hardware resources, including the CPU 1305, and processing elements and other components of the stream computing application. In addition, an operating system provides common services for application programs, such as providing a time function.

Figure 7:
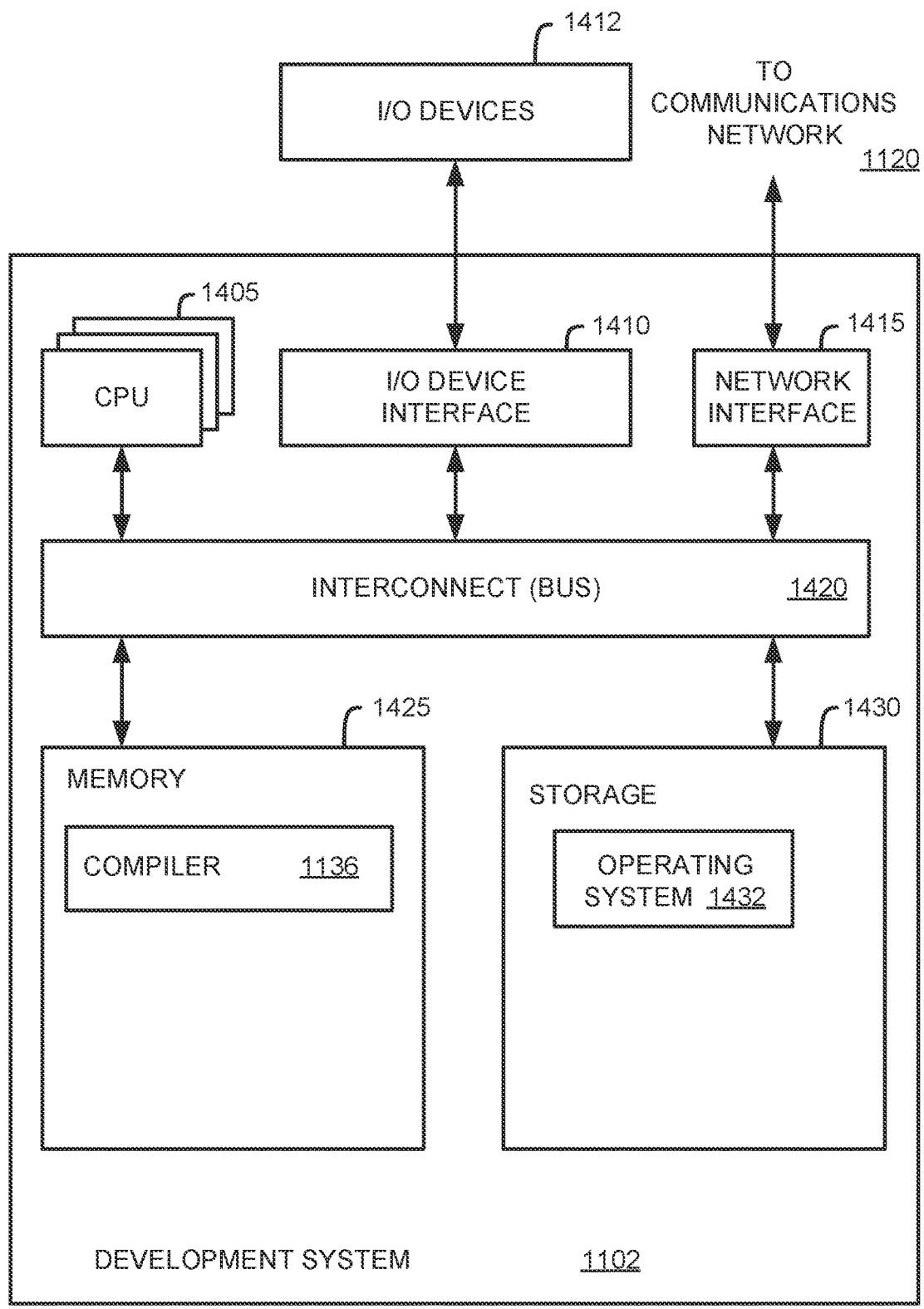
FIG. 7 illustrates a more detailed view of the development system of FIG. 4.

FIG. 7 is a more detailed view of development system 1102 of FIG. 4 according to some embodiments. Development system 1102 may include, without limitation, one or more processors (CPUs) 1405, network interface 1415, interconnect 1420, memory 1425, and storage 1430. Development system 1102 may also include I/O device interface 1410 connecting I/O devices 1412, e.g., keyboard, display, and mouse devices, to the development system 1102.

Each CPU 1405 retrieves and executes programming instructions stored in memory 1425 or storage 1430. Similarly, each CPU 1405 stores and retrieves application data residing in the memory 1425 or storage 1430. Interconnect 1420 is used to move data, such as programming instructions and application data, between CPU 1405, I/O device interface 1410, storage unit 1430, network interface 1415, and memory 1425. Interconnect 1420 may be one or more busses. CPUs 1405 may be a single CPU, multiple CPUs, or a single CPU having multiple processing cores in various embodiments. In one embodiment, processor 1405 may be a DSP. Memory 1425 is generally included to be representative of a random-access memory, e.g., SRAM, DRAM, or Flash. The storage 1430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. Network interface 1415 is configured to transmit data via communications network 1120.

Development system 1102 may include one or more operating systems 1432. Operating system 1432 may be stored partially in memory 1425 and partially in storage 1430. Alternatively, an operating system may be stored entirely in memory 1425 or entirely in storage 1430. The operating system provides an interface between various hardware resources, including the CPU 1405, and processing elements and other components of the stream computing application. In addition, an operating system provides common services for application programs, such as providing a time function.

Memory 1425 may store compiler 1136. Compiler 1136 compiles modules, which include source code or statements, into the object code, which includes machine instructions that execute on a processor. In one embodiment, compiler 1136 may translate the modules into an intermediate form before translating the intermediate form into object code. Compiler 1136 may output a set of deployable artifacts that may include a set of processing elements and an application description language file (ADL file), which is a configuration file that describes the stream computing application. In some embodiments, compiler 1136 may be a just-in-time compiler that executes as part of an interpreter. In other embodiments, compiler 1136 may be an optimizing compiler. In various embodiments, compiler 1136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of compiler 1136 may be represented by an operator graph, e.g., operator graph 1132 of FIG. 4.

Compiler 1136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. Compiler 1136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 8:
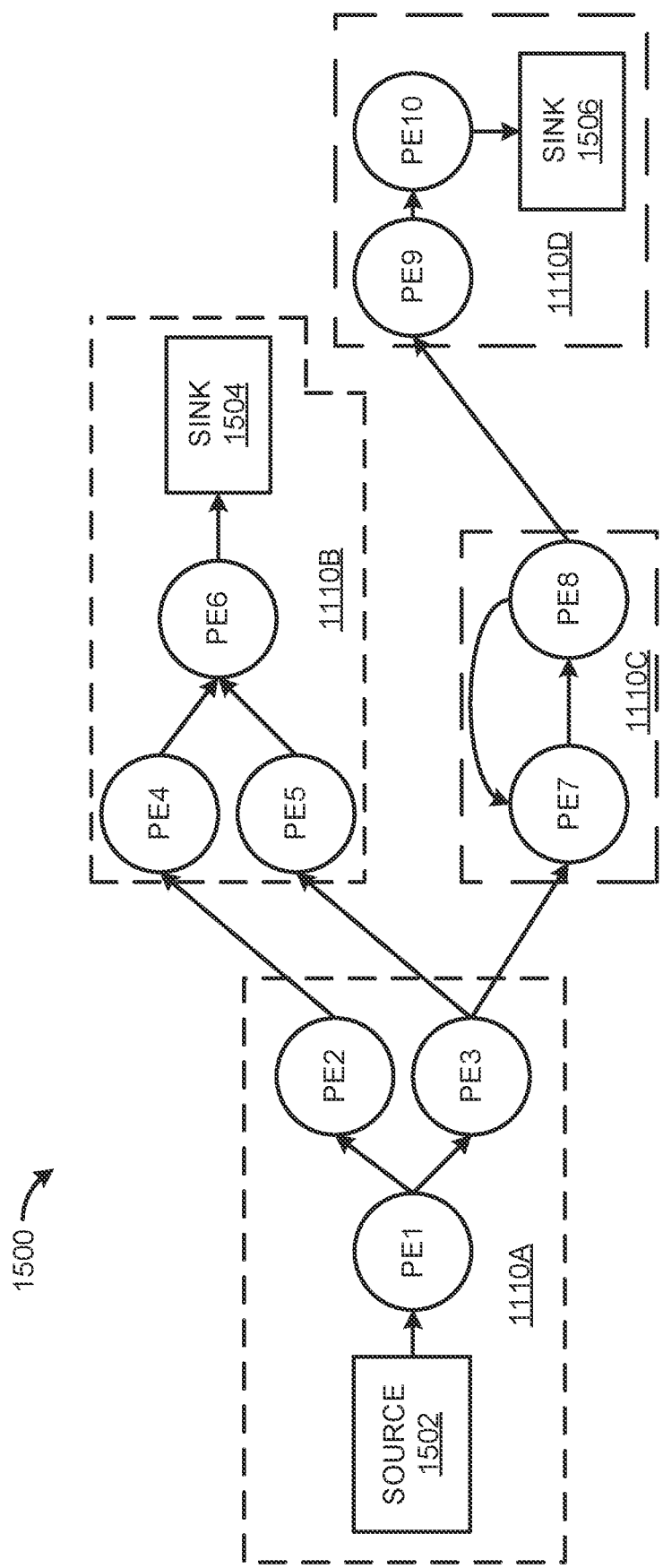
FIG. 8 illustrates an operator graph for a stream computing application.

FIG. 8 illustrates an exemplary operator graph 1500 for a stream computing application beginning from one or more sources 1502 through to one or more sinks 1504, 1506, according to some embodiments. This flow from source to sink may also be generally referred to herein as an execution path. In addition, a flow from one processing element to another may be referred to as an execution path in various contexts. Although FIG. 8 is abstracted to show connected processing elements PE1-PE10, the operator graph 1500 may include data flows between stream operators 1240 (FIG. 5) within the same or different processing elements. Typically, processing elements, such as processing element 1235 (FIG. 5), receive tuples from the stream as well as output tuples into the stream (except for a sink—where the stream terminates, or a source—where the stream begins). While the operator graph 1500 includes a relatively small number of components, an operator graph may be much more complex and may include many individual operator graphs that may be statically or dynamically linked together.

The example operator graph shown in FIG. 8 includes ten processing elements (labeled as PE1-PE10) running on the compute nodes 1110A-1110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

Operator graph 1500 begins at source 1502 and ends at sink 1504, 1506. Compute node 1110A includes the processing elements PE1, PE2, and PE3. Source 1502 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 1110B. Likewise, the tuples output by PE4 flow to operator sink PE6 1504. Similarly, tuples flowing from PE3 to PE5 also reach the operators in sink PE6 1504. Thus, in addition to being a sink for this example operator graph, PE6 could be configured to perform a join operation, combining tuples received from PE4 and PE5. This example operator graph also shows tuples flowing from PE3 to PE7 on compute node 1110C, which itself shows tuples flowing to PE8 and looping back to PE7. Tuples output from PE8 flow to PE9 on compute node 1110D, which in turn outputs tuples to be processed by operators in a sink processing element, for example PE10 1506.

The tuple received by a particular processing element 1235 (FIG. 5) is generally not considered to be the same tuple that is output downstream. Typically, the output tuple is changed in some way. An attribute or metadata may be added, deleted, or changed. However, it is not required that the output tuple be changed in some way. Generally, a particular tuple output by a processing element may not be considered to be the same tuple as a corresponding input tuple even if the input tuple is not changed by the processing element. However, to simplify the present description and the claims, an output tuple that has the same data attributes as a corresponding input tuple may be referred to herein as the same tuple.

Processing elements 1235 (FIG. 5) may be configured to receive or output tuples in various formats, e.g., the processing elements or stream operators could exchange data marked up as XML documents. Furthermore, each stream operator 1240 within a processing element 1235 may be configured to carry out any form of data processing functions on received tuples, including, for example, writing to database tables or performing other database operations such as data joins, splits, reads, etc., as well as performing other data analytic functions or operations.

The stream manager 1134 of FIG. 4 may be configured to monitor a stream computing application running on compute nodes, e.g., compute nodes 1110A-1110D, as well as to change the deployment of an operator graph, e.g., operator graph 1132. Stream manager 1134 may move processing elements from one compute node 1110 to another, for example, to manage the processing loads of compute nodes 1110A-1110D in computing infrastructure 1000. Further, stream manager 1134 may control the stream computing application by inserting, removing, fusing, un-fusing, or otherwise modifying the processing elements and stream operators (or what tuples flow to the processing elements) running on compute nodes 1110A-1110D.

Because a processing element may be a collection of fused stream operators, it is equally correct to describe the operator graph as one or more execution paths between specific stream operators, which may include execution paths to different stream operators within the same processing element. FIG. 8 illustrates execution paths between processing elements for the sake of clarity.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-situation data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    determining a baseline of behavior for a population of users that interact with an autonomous agent that is configured to respond to natural language prompts of users of the population using respective user profiles for each user of the population;
    identifying an element associated with a first user of the population that deviates more than a threshold amount from the baseline of behavior, wherein the threshold amount is specified by the first user;
    causing, in response to identifying that the element deviates more than the threshold amount, the autonomous agent to engage the first user unprompted regarding the element via an engagement that is configured to verify an association between the first user and the element, wherein the engagement includes providing an autonomous response to the first user that contains an element associated with a prompt from the first user and the element that deviates more than the threshold amount from the baseline of behavior;
    determining that a response from the first user regarding the engagement verifies the association between the first user and the element that deviates more than the threshold amount from the baseline of behavior; and
    updating a first user profile of the respective user profiles that corresponds to the first user in response to determining that the first user response verifies the association.

2. The computer-implemented method of claim 1, further comprising:
    receiving a new prompt from the first user for the autonomous agent, wherein the new prompt is of a class for which the autonomous agent is configured to reply in a first manner for the first population;
    identifying that the update to the first user profile in response to determining that the response from the first user verifies the association indicates a preference of replying in a second manner rather than the first manner; and
    responding to the new prompt in the second manner in response to identifying that the first user profile indicates the preference for the second manner.

3. The computer-implemented method of claim 1, wherein the element is identified via the first user interacting with functionality of a computer device other than the autonomous agent.

4. The computer-implemented method of claim 1, wherein the autonomous agent engages the first user during a period in which the first user is not engaged with the autonomous agent.

5. The computer-implemented method of claim 1, wherein the baseline of behavior is a first baseline of behavior of a plurality of baselines of behavior and the population of users is a first population of users of a plurality of populations of users, the method further comprising:

determining each of the plurality of baselines of behavior, wherein each baseline of behavior corresponds to one of the plurality of populations of users regarding a plurality of subjects using respective user profiles for each of the users of the plurality of populations.

6. The computer-implemented method of claim 5, further comprising generating and updating each of the plurality of baselines of behavior in real-time using stream-based computing.

7. The computer-implemented method of claim 5, further comprising:
gathering data on the first user; and
determining that the first user belongs to the first population.

8. The computer-implemented method of claim 1, wherein the autonomous agent is part of a question answering (QA) system.

9. A system comprising:
a processor; and
a memory in communication with the processor, the memory containing instructions that, when executed by the processor, cause the processor to:
determine a baseline of behavior for a population of users that interact with an autonomous agent that is configured to respond to natural language prompts of users of the population using respective user profiles for each user of the population;
identify an element associated with a first user of the population that deviates more than a threshold amount from the baseline of behavior, wherein the threshold amount is specified by the first user;
cause, in response to identifying that the element deviates more than the threshold amount, the autonomous agent to engage the first user unprompted regarding the element via an engagement that is configured to verify an association between the first user and the element, wherein the engagement includes providing an autonomous response to the first user that contains an element associated with a prompt from the first user and the element that deviates more than the threshold amount from the baseline of behavior;
determine that a response from the first user regarding the engagement verifies the association between the first user and the element that deviates more than the threshold amount from the baseline of behavior; and
update a first user profile of the respective user profiles that corresponds to the first user in response to determining that the first user response verifies the association.

10. The system of claim 9, wherein the memory contains further instructions that, when executed by the processor, cause the processor to:
receive a new prompt from the first user for the autonomous agent, wherein the new prompt is of a class for which the autonomous agent is configured to reply in a first manner for the first population;
identify that the update to the first user profile in response to determining that the response from the first user verifies the association indicates a preference of replying in a second manner rather than the first manner; and
respond to the new prompt in the second manner in response to identifying that the first user profile indicates the preference for the second manner.

11. The system of claim 9, wherein the element is identified via the first user interacting with functionality of a computer device other than the autonomous agent.

12. The system of claim 9, wherein the autonomous agent engages the first user during a period in which the first user is not engaged with the autonomous agent.

13. The system of claim 9, wherein the baseline of behavior is a first baseline of behavior of a plurality of baselines of behavior and the population of users is a first population of users of a plurality of populations of users, the memory containing further instructions that, when executed by the processor, cause the processor to:
determine each of the plurality of baselines of behavior, wherein each baseline of behavior corresponds to one of the plurality of populations of users regarding a plurality of subjects using respective user profiles for each of the users of the plurality of populations.

14. The system of claim 13, wherein the memory contains further instructions that, when executed by the processor, cause the processor to generate and update each of the plurality of baselines of behavior in real-time using stream-based computing.

15. The system of claim 13, wherein the memory contains further instructions that, when executed by the processor, cause the processor to:
gather data on the first user; and
determine that the first user belongs to the first population.

16. The system of claim 9, wherein the autonomous agent is part of a question answering (QA) system.

17. A computer program product, the computer program product comprising a computer readable storage medium having program instructions embodied therewith, the program instructions executable by a computer to cause the computer to:
determine a baseline of behavior for a population of users that interact with an autonomous agent that is configured to respond to natural language prompts of users of the population using respective user profiles for each user of the population;
identify an element associated with a first user of the population that deviates more than a threshold amount from the baseline of behavior, wherein the threshold amount is specified by the first user;
cause, in response to identifying that the element deviates more than the threshold amount, the autonomous agent to engage the first user unprompted regarding the element via an engagement that is configured to verify an association between the first user and the element, wherein the engagement includes providing an autonomous response to the first user that contains an element associated with a prompt from the first user and the element that deviates more than the threshold amount from the baseline of behavior;
determine that a response from the first user regarding the engagement verifies the association between the first user and the element that deviates more than the threshold amount from the baseline of behavior; and
update a first user profile of the respective user profiles that corresponds to the first user in response to determining that the first user response verifies the association.

18. The computer program product of claim 17, the computer readable storage medium containing further instructions that, when executed by the computer, cause the computer to:
receive a new prompt from the first user for the autonomous agent, wherein the new prompt is of a class for which the autonomous agent is configured to reply in a first manner for the first population;

identify that the update to the first user profile in response to determining that the response from the first user verifies the association indicates a preference of replying in a second manner rather than the first manner; and respond to the new prompt in the second manner in response to identifying that the first user profile indicates the preference for the second manner.

19. The computer program product of claim 17, wherein the baseline of behavior is a first baseline of behavior of a plurality of baselines of behavior and the population of users is a first population of users of a plurality of populations of users, the computer readable storage medium containing further instructions that, when executed by the computer, cause the computer to:

determine each of the plurality of baselines of behavior, wherein each baseline of behavior corresponds to one of the plurality of populations of users regarding a plurality of subjects using respective user profiles for each of the users of the plurality of populations.

20. The computer program product of claim 19, wherein the computer readable storage medium contains further instructions that, when executed by the computer, cause the computer to generate and update each of the plurality of baselines of behavior in real-time using stream-based computing.

* * * * *